March 2, 1926.
E. W. ISOM ET AL
APPARATUS FOR CONDENSING VAPORS
Filed May 27, 1921
1,575,269
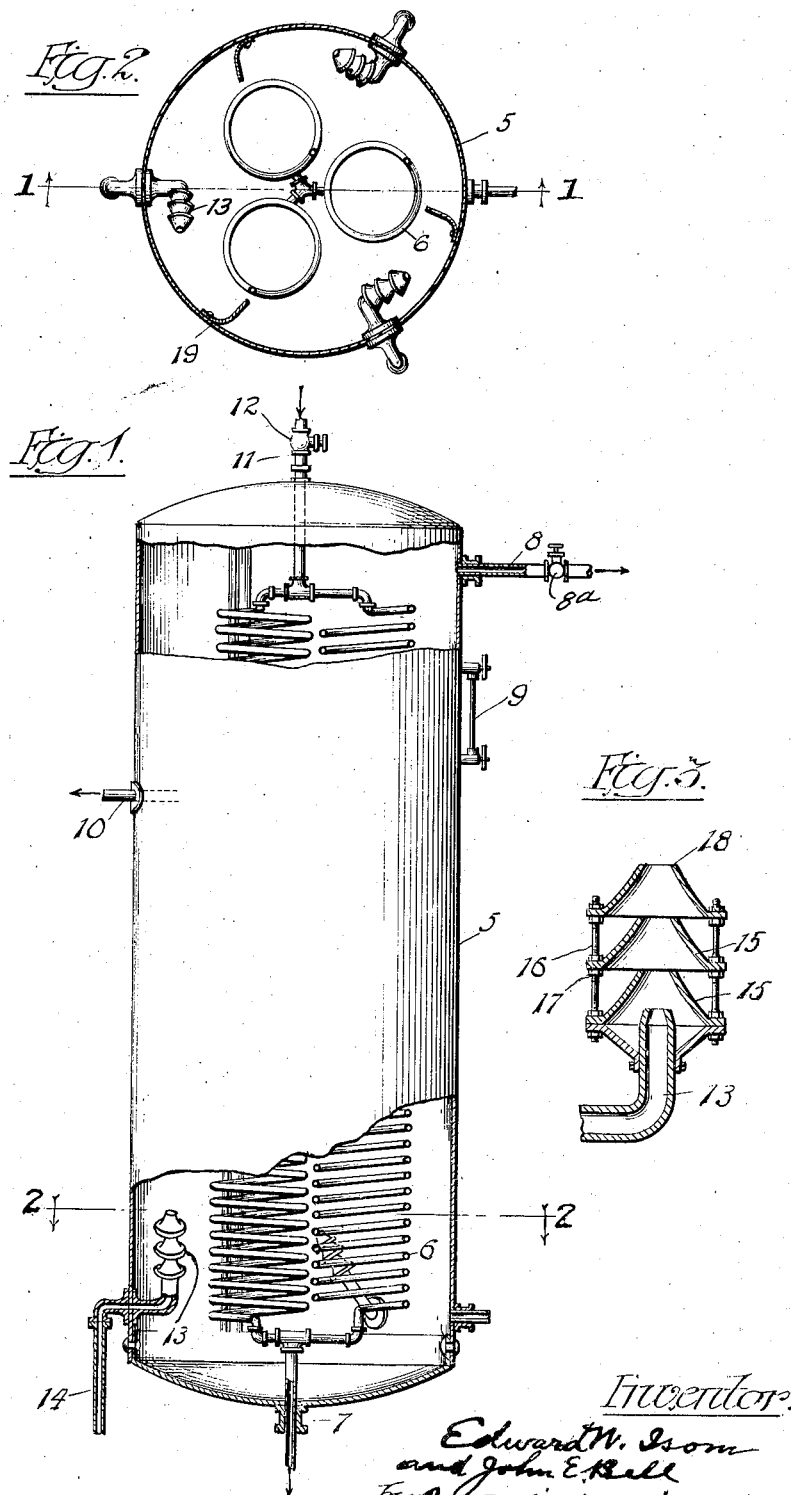

Patented Mar. 2, 1926.

1,575,269

UNITED STATES PATENT OFFICE.

EDWARD W. ISOM, OF WINNETKA, ILLINOIS, AND JOHN E. BELL, OF BROOKLYN, NEW YORK, ASSIGNORS TO SINCLAIR REFINING COMPANY, OF CHICAGO, ILLINOIS, A CORPORATION OF MAINE.

APPARATUS FOR CONDENSING VAPORS.

Application filed May 27, 1921. Serial No. 472,999.

*To all whom it may concern:*

Be it known that we, EDWARD W. ISOM and JOHN E. BELL, citizens of the United States, residing, respectively, at Winnetka, county of Cook, and State of Illinois, and Brooklyn, county of Kings, and State of New York, have invented certain new and useful Improvements in Apparatus for Condensing Vapors, of which the following is a specification.

Our invention is more particularly designed for use in the condensation of hydrocarbon vapors from oil stills. The vapors from oil stills always include in admixture therewith an amount, which may vary, of gases which are not condensed in ordinary practice. These gases tend to carry with them condensable constituents. Our invention is particularly designed to condense as great an amount as possible of the vapors and to cool the uncondensable gases and to relieve these gases of condensable constituents which they might otherwise carry with them uncondensed. In certain broader aspects, our invention is also useful in condensing other vapors. In the practice of our invention we maintain in a suitable tank or receptacle a considerable body of condensate of the vapors to be condensed, constantly cooling the liquid and injecting thereinto the vapors and gases as they come from the still, preferably near the bottom of the body of liquid in such manner that the liquid is constantly agitated or circulated into contact with the cooling means, and the liquid about the nozzles by which the vapor is injected is constantly renewed, the more heated liquid passing away and being replaced by cooler liquid which has been in contact with or under the influence of the cooling coils.

In the accompanying drawings we have shown and in the following specification described a preferred form of the invention. It is to be understood however, that the specific disclosure is for the purpose of exemplification only and that the scope of the invention is defined in the following claims in which we have endeavored to distinguish it from the prior art in so far as known to us without however, relinquishing or abandoning any portion or feature thereof. In the drawings accompanying and forming a part of this application, Fig. 1 is a side elevation partly in section on the line 1—1 of Fig. 2 of a condenser for practicing our invention and embodying the features thereof; Fig. 2 a horizontal section on the line 2—2 of Fig. 1 and Fig. 3 an enlarged section of a detail. Each part is identified by the same reference characters wherever it occurs in the several views.

Referring to the drawings, the tank 5 in which the body of condensate is maintained is a vertical cylinder with closed top and bottom. The means for cooling the condensate consists in a series of coils 6, here shown as 3 in number, the lower ends of the coils being connected together and to an outlet 7. The upper ends of the coils are likewise connected together and to an inlet connection 11. The cooling liquid enters at the inlet 11 and passes through the cooling coils 6 and exhausts through the outlet 7. Water may be used as the cooling medium although it may be preferred to use the oil or other liquid to be distilled which is given a preliminary heating in this manner. Preferably the tank is kept nearly full of condensate, a gauge glass 9 being provided for the purpose of observing the liquid level and a draw-off or overflow 10 controlled by a hand valve or in other suitable manner is used to draw off the liquid as it accumulates above the desired height or normal liquid level in the tank. The upper end of the tank is furnished with an exhaust pipe 8 and a valve 8ᵃ may be provided for relieving the tank of fixed gas as the pressure increases beyond that which it is desired or convenient to maintain. Atmospheric or lower pressures may be maintained however if desired.

The vapors as they come from the still are introduced near the bottom of the tank and preferably in an upwardly inclined direction to accomplish a constant rapid circulation of the condensate. In the preferred form of device, the vapors from the still are introduced by a series of nozzles, shown as three in number and equally spaced about the periphery of the tank nearer the lower end thereof. The nozzles proper 13, receive the vapor from the supply pipes 14 leading from the still or stills under sufficient pressure to force the vapors into the liquid condensate. Each nozzle 13 is constructed or formed with a series of conical deflectors 15 axially arranged over the nozzle and spaced apart by bolts 16 and nuts 17 so that a free passage for the circulation or induction of the liquid condensate is provided between adjacent deflector plates. The heated vapors entering the tank through the nozzles 13 and projected through the central openings 18 of the deflector cones draw the liquid condensate by an ejector action between the cones and are thoroughly mixed therewith. Thus a rapid circulation of relatively large streams or currents of condensate is effected in the tank.

Preferably the tank is provided with substantially vertical ribs 19 arranged between the nozzles which ribs are curved for the purpose of deflecting the currents of condensate caused by the nozzles away from the periphery of the tank and toward and among the cooling coils.

It will now be understood that the body of condensate within the tank is maintained at such temperature by the cooling coils as to condense the vapors brought into contact therewith under the conditions provided. The vapor entering the tank under high pressure and with considerable velocity is thoroughly commingled with the liquid condensate and before it can reach the upper surface of the latter is cooled and condensed. The condensate is rapidly circulated about and through the cooling coils and new bodies or portions thereof are continuously brought into contact with the entering vapors. Such fixed gases as enter the tank with the vapors bubble through the condensate into the open space above the liquid from which it is drawn off from time to time through the outlet 8.

We claim:

1. In an apparatus for cooling and condensing mixtures of hydrocarbon vapors and gases, a tank, cooling coils arranged therein, means for maintaining a substantially constant liquid level in the tank, nozzles arranged to discharge into the lower part of the tank below the normal liquid level and thoroughly to agitate liquid in the tank and connections for introducing the mixture of hydrocarbon vapors and gases to be cooled and condensed to said nozzles.

2. In an apparatus for cooling and condensing mixtures of hydrocarbon vapors and gases, a tank, cooling coils arranged therein, means for supplying a cooling liquid to said coils and means for removing said liquid therefrom, a draw-off for maintaining a substantially constant level of liquid in the tank, nozzles arranged to discharge into the lower portion of the tank below the normal liquid level and thoroughly to agitate liquid in the tank and connections from a source of mixed hydrocarbon vapors and gases to said nozzles.

3. In an apparatus for cooling and condensing mixtures of hydrocarbon vapors and gases, a tank, cooling coils in the tank, means for supplying said coils with a cooling liquid and means for removing said liquid therefrom, a liquid draw-off near the top of the tank and a series of nozzles arranged to discharge into the lower part of the tank below the normal liquid level in the tank and inclined therein so as to cause a movement of rotation of the liquid in the tank and thoroughly to agitate the liquid therein.

4. In an apparatus for cooling and condensing mixtures of hydrocarbon vapors and gases, a tank adapted to contain the liquid formed from the condensed vapors, cooling coils arranged below the normal liquid level therein, nozzles arranged to discharge below the normal liquid level for injecting the vapors and gases into liquid in the tank in proximity to the cooling coils and for thoroughly agitating liquid in the tank, and connections for supplying the hydrocarbon vapors and gases to the nozzles.

5. In an apparatus for condensing vapors, a tank adapted to contain the liquid formed from the condensed vapors, cooling coils arranged below the normal liquid level therein, nozzles arranged to discharge below the normal liquid level for injecting the vapors into liquid in the tank in proximity to the cooling coils, said nozzles being disposed angularly with respect to the coils whereby the liquid and injected vapors are circulated around the coils and thoroughly agitated, and connections for supplying vapors to the nozzles.

6. In an apparatus for condensing vapors, a tank adapted to contain the liquid formed from the condensed vapors, cooling coils immersed therein, nozzles immersed in the liquid for injecting the vapors into proximity to the cooling coils, said nozzles being disposed angularly with respect to the coils whereby the liquid and injected vapors are circulated around the coils, a baffle arranged to divert the flow of liquid and vapor through the coils, and connections for supplying the vapor to the nozzles.

7. In an apparatus for cooling and condensing mixtures of hydrocarbon vapors and gases, a tank adapted to contain liquid formed from the condensed vapors, cooling coils arranged below the normal liquid level therein, a plurality of nozzles for injecting the vapors below the normal liquid level and for thoroughly agitating the liquid, and connections for supplying mixed hydrocarbon vapors and gases to the nozzles.

8. In an apparatus for condensing vapors, a tank adapted to contain the liquid formed from the condensed vapors, cooling coils arranged below the normal liquid level therein, a plurality of nozzles for injecting the vapors below the normal liquid level, said nozzles being disposed angularly with respect to the coils whereby the liquid and injected vapors are circulated around the coils and thoroughly agitated, and connections for supplying vapors to the nozzles.

9. In an apparatus for condensing vapors, a tank adapted to contain the liquid formed from the condensed vapors, cooling coils arranged therein, a plurality of nozzles for injecting the vapors below the surface of the liquid, said nozzles being disposed angularly with respect to the coils whereby the liquid and injected vapors are circulated around the coils, a baffle arranged adjacent each nozzle to divert the flow of liquid and vapors through the coils, and connections for supplying the vapors to the nozzles.

10. In an apparatus for condensing vapors, a tank adapted to contain the liquid formed from the condensed vapors, cooling coils arranged therein, a plurality of nozzles for injecting the vapors to be condensed below the surface of the liquid, said nozzles being disposed angularly with respect to the coils whereby the liquid and incoming vapors are circulated around the coils, a plurality of baffles secured to the tank in the path of the flow of injected vapors to divert them across the coils, and connections for supplying the vapors to the nozzles.

11. In an apparatus for cooling and condensing mixtures of hydrocarbon vapors and gases, a tank adapted to contain liquid formed from the condensed vapors, cooling coils arranged below the normal liquid level therein, nozzles for injecting the vapors and gases below the normal liquid level and for thoroughly agitating the liquid, a draw-off pipe connected to the tank adjacent the normal liquid level, a relief valve arranged above the normal liquid level for the escape of gas, and connections for supplying the mixed vapors and gases to the nozzles.

12. In an apparatus for cooling and condensing mixtures of hydrocarbon vapors and gases, a tank adapted to contain the liquid formed from the condensed vapors, cooling coils arranged below the normal liquid level therein, and connections for injecting the vapors and gases below the normal liquid level and for thoroughly agitating and mixing the vapors, gases and liquid, including nozzles arranged to inject the vapors and gases and entrain the liquid adjacent thereto to circulate the mixture about the coils.

13. In an apparatus for cooling and condensing mixtures of hydrocarbon vapors and gases, a tank adapted to contain the liquid formed from the condensed vapors, cooling coils arranged below the normal liquid level therein, and connections for injecting the vapors and gases into the tank below the normal liquid level and for thoroughly agitating and mixing the vapors, gases and liquid, including nozzles having a series of apertured disks arranged to entrain the adjacent liquid with the incoming vapors and gases and to circulate the mixture about the coils.

EDWARD W. ISOM.
JOHN E. BELL.